(12) United States Patent
Crandall et al.

(10) Patent No.: US 7,229,562 B2
(45) Date of Patent: Jun. 12, 2007

(54) INTEGRATED DUAL CROSS FLOW FILTRATION AND ULTRASONIC TRANSDUCER ASSEMBLY

(75) Inventors: Raymond K. Crandall, Rochester, NY (US); Kenneth Strong, Rochester, NY (US); Robert Meyer, Penfield, NY (US)

(73) Assignee: Xerox Corporation, Stamford, CT (US)

(*) Notice: Subject to any disclaimer, the term of this patent is extended or adjusted under 35 U.S.C. 154(b) by 267 days.

(21) Appl. No.: 10/909,082

(22) Filed: Jul. 30, 2004

(65) Prior Publication Data

US 2006/0021950 A1 Feb. 2, 2006

(51) Int. Cl.
*B01D 29/72* (2006.01)
(52) U.S. Cl. .................. 210/748; 210/106; 210/236; 210/332; 210/388; 210/433.1; 210/785
(58) Field of Classification Search ............... 210/106, 210/107, 153, 225, 321.67, 322, 323.1, 327, 210/332, 346, 388, 407, 433.1, 636, 748, 210/785, 236, 791; 55/292; 118/610, 612
See application file for complete search history.

(56) References Cited

U.S. PATENT DOCUMENTS

| | | | |
|---|---|---|---|
| 2,381,453 A * | 8/1945 | Hunziker .................. 210/323.1 |
| 4,991,609 A | 2/1991 | Browning |
| 5,062,965 A | 11/1991 | Bernou et al. |
| 5,090,430 A | 2/1992 | Nixon |
| 5,118,355 A | 6/1992 | Browning |
| 5,681,391 A * | 10/1997 | Mistrater et al. ........... 118/400 |
| 6,221,255 B1 | 4/2001 | Vadoothker |
| 6,395,186 B1 | 5/2002 | De Kock et al. |
| 6,396,892 B1 | 5/2002 | Frattini et al. |
| 6,702,941 B1 | 3/2004 | Haq et al. |
| 6,716,361 B2 | 4/2004 | Diebel et al. |
| 2004/0016699 A1 | 1/2004 | Bayevsky |

FOREIGN PATENT DOCUMENTS

WO     WO 98/56493     12/1998

OTHER PUBLICATIONS

Jacobs, E. P et al. Non-Invasive in Situ visualisation of membrane fouling and cleaning processes in microfiltration by ultrasonic signal reflection Water SA vol. 28 2002, pp. 78-85.
Abbot E. H. Ultrasonically enhanced cross-flow filtration Cent Res Technol PibI CRTD ASCE vol. 64 2002 pp. 709-713.

(Continued)

*Primary Examiner*—Matthew O. Savage
(74) *Attorney, Agent, or Firm*—Pillsbury Winthrop Shaw Pittman, LLP

(57) ABSTRACT

A filtration system comprising a filter cassette having integrated ultrasonic transducers incorporated therein, and a method for using the same. The integrated system of filters and transducers can be hardened for use in hazardous environments, and is particularly suitable for the implementation of sonication in cross flow filtration processes further integrated with a manufacturing process. The system provides cost savings both in terms of less equipment and space for cleaning processes on the manufacturing floor.

16 Claims, 3 Drawing Sheets

OTHER PUBLICATIONS

Kobayashi, T. et al. Ultrasound Enhanced cross-flow membrane filtration. Separation and Purification Technology v. 17 n. 1 1999, pp. 31-40.

Chi, Xijun et al. Ultrasound—Associated cleaning of polymeric membranes for water treatment. Separation and Purification Technology v.15 n.2 Mar. 8, 1999. pp. 139-146.

Caldwell S., et al. Large scale purification process for recombinant NSI—OspA as a candidate vaccine for lyme disease. Bioseparation V.2 n.2 Apr. 1996 pp. 115-123.

White, D.A., et al. Optimization of intermittently operated microfiltration processes. Chemical Engineering Journal and Biochemical Engineering Journal V.52 n.2 Sep. 1993 pp. 73-77.

Tarleton, E.S. et al. Electro-acoustic crossflow microfiltration Filtration and Separation V.29 n.5 Sep.-Oct. 1992 pp. 425-432.

Wakeman, R.J. et al. Experimental study of electroacoustic crossflow microfiltration. Chemical Eng. Research and Design V.69 n.5 Sep. 1991 pp. 386-397.

* cited by examiner

INTEGRATED DUAL CROSS FLOW FILTRATION AND ULTRASONIC TRANSDUCER ASSEMBLY

BACKGROUND

Disclosed is a filtration system that utilizes cross flow filtration. More specifically, the present invention relates to an integrated filtration system utilizing ultrasonic assisted cross flow filtration, which system is further integrated with a manufacturing process.

Filtration is a commonly used technique to separate dispersed components from liquids or gases by various separating means such as semi-permeable membranes and other layers or stacks of material containing different perforations. The perforations usually serve to exclude filtered components by size. The most common filtration of dispersed components involves the separation of solids from fluids, and vice versa, through the use of fluid treatment elements, such as filters. Various filtration techniques have been tried in the past, but clogging of filters can be a problem particularly in industrial applications where flow rates are important for process and production rates. Flow rates can diminish upon clogging of the filter through which the fluid passes. Prior art shows different approaches in addressing these problems, either by providing different treatment media, such as polymeric, ceramic or metal filters, or by providing declogging techniques for a given treatment medium, such as electrostatic discharging, heating or ultrasonic agitation.

As described by Haq in U.S. Pat. No. 6,702,941, of the various types of filtration techniques, a type known as "dead-end treatment", introduces the fluid dispersion to be filtered, or treated, into a fluid treatment element, such as a membrane filter, and the entire amount or substantially all of the fluid passes through the fluid treatment medium of the fluid treatment element to be filtered or otherwise treated. In another type of fluid treatment, known as cross flow filtration, a fluid to be treated is introduced into a fluid treatment element and is made to flow along the surface of a fluid treatment medium of the fluid treatment element. This flow of fluid along the surface is referred to as cross flow. Only a portion of the fluid passes through the fluid treatment medium to be filtered or otherwise treated, while the remainder of the fluid is discharged from the fluid treatment element without passing through the fluid treatment medium. In cross flow filtration, the fluid (feed) stream runs in tangential direction to the filter, such as a membrane filter, for example, establishing a pressure differential across the membrane, causing some of the particles to pass through the membrane. As the remaining particles continue to flow along the membrane, they have the effect of "cleaning it". The untreated fluid may be recirculated for another pass at the filter element. In contrast to the perpendicular flow of dead-end filtration technique, the use of a tangential flow prevents thicker particles from packing or building up a "filter cake".

The fluid which is introduced into the element for treatment is referred to as process fluid; the fluid which passes through the fluid treatment medium is referred to as filtrate; and the fluid which is discharged from the fluid treatment element without passing through the fluid treatment medium is referred to as retentate. The cross flow of fluid along the surface of the fluid treatment medium generates a fluid shear force in the fluid adjoining the fluid treatment medium which slows the rate at which particles accumulate on the fluid treatment medium. However, even though cross flow filtration may improve filtration performance in certain applications, the filtration process may further need be augmented by vibrating the filter media or by flow pulsing/reversing for cleaning the filter. Polymers and other chemicals have also been used to reduce caking of solids on the filter media, and additionally, filter-aids like anticoagulant additives have been used to increase flow rates.

Another highly effective technique for enhancing filtration involves ultrasonic cleaning, which is described by Vadoothker in U.S. Pat. No. 6,221,255. Ultrasound is in this arrangement a mechanical form of energy with frequencies above 18 kHz. It can impact solids, liquids, and gasses under appropriate conditions causing either temporary or permanent physical and chemical changes. High frequency (500 kHz) ultrasound waves have been used to bombard aqueous and organic suspensions. This impact breaks the molecules and provides chemically active radicals free to react with other radicals and molecules. Ultrasound has also been well recognized as useful in cleaning applications. As the basis for this serves the ability of ultrasound to vibrate its target to loosen dirt and solids away from the contact surface. Ultrasound applications today abound in medical diagnostics, process control, soldering, and numerous mechanical biological and chemical areas.

The contents of the entire prior art references cited herein are incorporated by reference.

Although ultrasound applications today abound in fields such as diagnostics, process control, soldering and numerous mechanical, biological and chemical areas, the use of sonication needs to be made more adaptable to filtration processes, and hence more practical and cost effective. Usually, when ultrasound transducers are contemplated for use in filtration, they are introduced as an adjunct to the whole process, and therefore are cumbersome. What is needed is a compact and portable filtration system with well integrated ultrasound transducers that, as a whole system, can be made to be more adaptable for use in different applications under different conditions.

For example, certain process sectors on a manufacturing line require special areas delineated from others because of their hazardous nature. These process sectors may also use fluids that require cleaning through filtration. In such situations, the process fluid is normally piped from the hazardous process sector to a separate filtration station outside or adjacent the hazardous sector. Consequently, the various components of a cleaning system, including filters, ultrasonic transducers, pumps and piping required for transferring fluids from the hazardous sector to the filtration station, and vice versa, involve complicated and costly equipment and space. It is desirable, therefore, to be able to bring into such a process sector a compact and portable filtration system that can easily be adapted to be used in that particular process sector on the manufacturing line. Thus, there exists a need for an apparatus or a system that takes advantage of the excellent cleaning properties of ultrasound transducers and integrates them into itself in such a manner so as to improve cleaning process fluids in an efficient and effective way, in particular, in cross flow filtration systems operating in hazardous environments.

SUMMARY

Aspects disclosed herein include
a system comprising one or more filter units comprising at least two filter elements forming a filtrate channel between the filter elements; a chamber adjacent to one or more of the filter sets; and in fluid communication with the filtrate channels; one or more transducers integrated into each of the chambers configured to direct an ultrasonic beam upon the filter element facing the transducer; one or more line inlet ports for inputting and circulating process fluid through the filtrate channel and over the filter elements and through the chambers; and one or more line outlet ports for removing filtrated fluid from the integrated filtration system;

a system comprising a plurality of sets of filter elements arranged in a group to form a filtration apparatus; a filtrate channel formed between the filter elements of each set of filter elements; a chamber formed between each set of filter elements within the group; one or more transducers integrated into each of the chambers configured to direct an ultrasonic beam upon the filter element facing the transducer; one or more line inlet ports for entry of recirculating process fluid over the filter elements through the chambers; one or more line outlet ports for recirculating process fluid away from the filter elements through the chambers; a plurality of outlet ports for removing filtrated fluid away from the filter elements through the filtrate channels; and a hazard proof encasement formed around the filtration apparatus.

a method comprising providing a plurality of sets of filter elements; arranging the filter elements of each set to form a filtrate channel therebetween the filter elements; arranging the plurality of sets of filter elements to form a plurality of chambers therebetween the sets of filter elements; integrating one or more transducers into the chambers configured to direct an ultrasonic beam upon the filter element facing the transducer; introducing process solution to the filter elements through the plurality of chambers via an inlet port; filtering the process solution through the filter elements to obtain clean filtrate; directing the ultrasonic beam of the transducer against the facing filter element with a force sufficient to dislodge material, which may collect on the filter element, into the process fluid for recirculation; removing the process fluid for recirculation away from the filter element via the chambers through an outlet port; and collecting clean filtrate from the filtrate channels via a filtrate outlet port.

DETAILED DESCRIPTION

Figure 1:
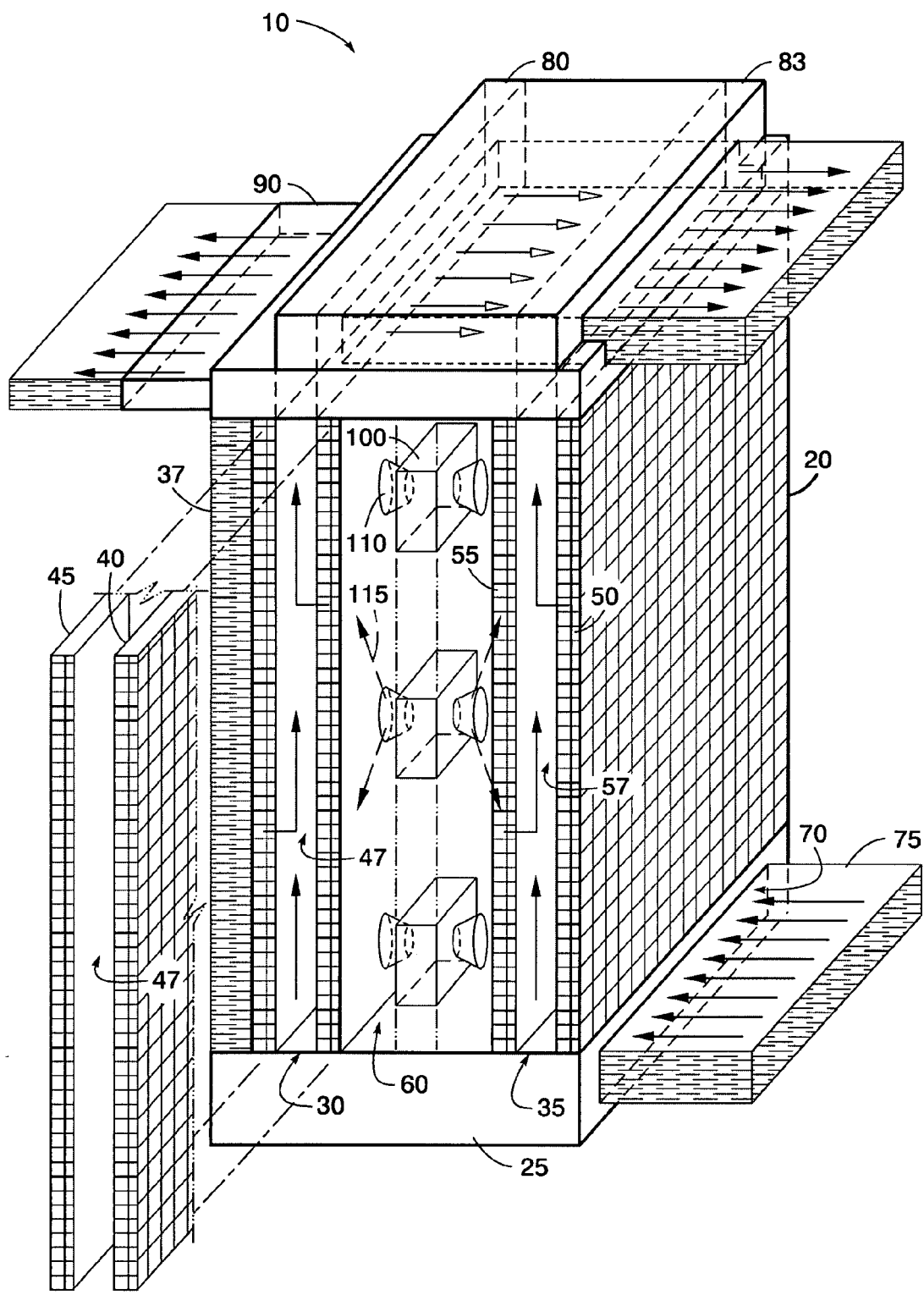
FIG. 1 is a perspective drawing showing an embodiment of the filtration system comprising an apparatus in the form of a filter cassette having integrated ultrasonic transducers incorporated therein.

In embodiments there is illustrated a filtration system comprising an apparatus in the form of a filter cassette having integrated ultrasonic transducers incorporated therein, and a method for using the same. The integrated system of filters and transducers can be hardened for use in hazardous environments, and is particularly suitable for the implementation of sonication in cross flow filtration processes further integrated with a manufacturing process.

Referring to the drawings, wherein like reference characters represent like elements or features throughout the various views, the integrated dual cross flow filtration and ultrasonic transducer assembly of the present invention is indicated generally in the figures by reference character 10.

An embodiment of the present invention 10 is shown in FIG. 1. It involves a tight integration of the filtration elements and the ultrasonic transducers of the assembly of components shown in the same FIG. 1, as described below. The tight integration feature provides short gap positioning or proximal distance between filter surface and ultrasonic transducer.

The components are assembled in a housing 20, in the form of a slotted cassette having two slots 30 and 35. The slots are configured to accept a set of filter elements. The slots form an open frame about the filter elements in the slots of the cassette, and that the faces of the filter elements are exposed to the environment surrounding the slots. In FIG. 1, the set of filter elements comprise a pair of filters 40 and 45 spaced apart to form a filtrate channel 47 between the filters. Of course, as one of ordinary skill in the art would recognize, the invention is not limited to pairs of filters only. Any number filter elements with corresponding number of filtrate channels may be formed. For purposes of illustration, FIG. 1 shows two sets of filter elements, namely 40, 45 and 50, 55. Also for purposes of clarity, first set 40 and 45 is depicted partially withdrawn out of its slot 30 in phantom, while the second set 50 and 55 is shown in its slot 35. It will be noted that the slots are delineated by walls that are shown schematically as heavy lines rather than as real walls with real thicknesses in order not to clutter the drawing. Space between the slots form a chamber referenced by numeral 60 in FIG. 1. Housing 20 in FIG. 1, therefore, forms a cassette for holding two sets of filter elements. However, it will be understood by those skilled in the art that the cassette can be formed to house any plurality of sets or filter elements. Furthermore, the filter elements are not limited to any specific shape, as they can be rectangular, circular, and other shapes.

The bottom portion 25 of cassette 20 housing the sets of filters, is configured to have an inlet port 70 to allow fluids, such as process fluids, to pass into chamber 60. Each set of filter elements, that is, each set of filter elements in the case shown in FIG. 1, is sealed against the incoming fluid 75—better seen in FIG. 2—such that the process fluid can enter the chamber 60 readily, without experiencing any resistance. There may be a plurality of chambers, such as 37 shown to the left of slot 30 when viewed from the reader's perspective. A similar channel to the right of slot 37 has been truncated to avoid clutter in the drawing. It is an aspect of the embodiment that the incoming fluid can enter chambers readily, with very little resistance.

In another embodiment, the process fluid in the chambers is forced to flow tangentially onto the filter elements 40, 45 and 50, 55. The process fluid is then filtered in cross flow through the filter elements into the filtrate channels 47 and 57. Upward arrows in the channels in FIG. 1 show the direction of flow of the cleaned filtrate flowing into towers 80 and 83. The dispersion cross flow that does not have the opportunity to pass through the filters finds its way to the recirculation tower 90, as shown in FIG. 1. The cleaned filtrate is then either pumped or suctioned to an appropriate area (not shown) where it is processed further. On the other hand, the fluid that could not be filtered, sometimes called the retentate, is pumped back to the filtration system which then reenters the cassette at inlet 75 for further filtration.

As described earlier, and as incorporated therein by reference to prior art, it is known that clogging of the filters can be a problem particularly in industrial applications where flow rates are important for process and production rates. An embodiment of the present invention addresses such problems by integrating ultrasound transducers in between sets of filters incorporated into the filtration cassette of the invention shown in FIG. 1. Although FIG. 1 shows only a set of three transducers 100, any number of transducers in a set can be integrated between the filters, and also any number of sets of transducers can be used depending upon the number of sets of filters are incorporated to the cassette. Thus the cassette provides a dual function of filtration as well as sonication for improved cleaning of process fluids in a compact filtration system.

Figure 2:
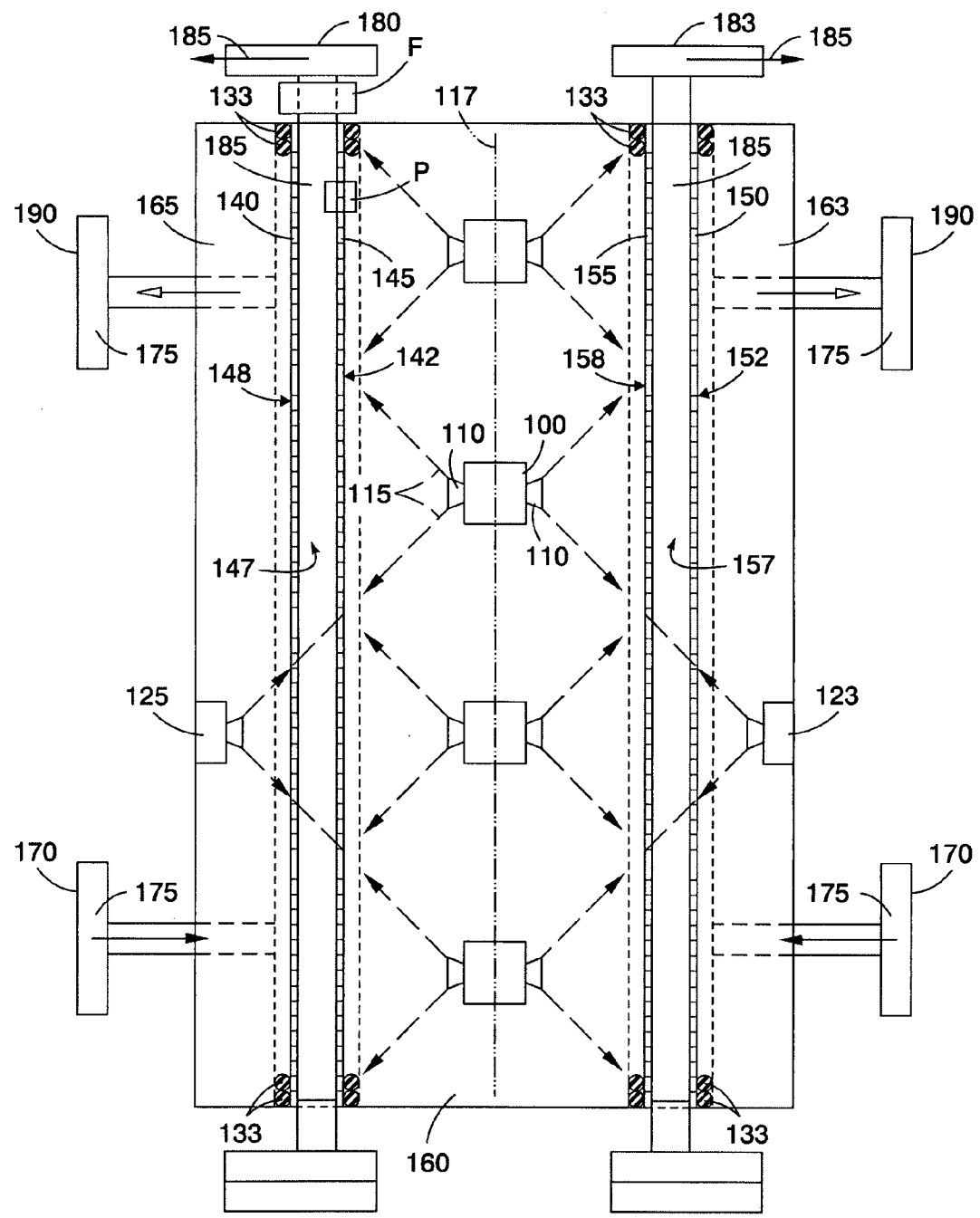
FIG. 2 is a drawing showing a cross-sectional view of the filter cassette of FIG. 1.

The operation of the filtration system of the present invention can be better seen in the schematic drawing shown in FIG. 2. The cassette in FIG. 2 also has two slots 130 and 135 into each of which a set of a set of filter elements 140, 145 and 150, 155, respectively, slide in. Each set of filter elements is held vertically in each slot by means of double o-rings 133 as shown in FIG. 2. It is an aspect of this embodiment that the o-rings perform a dual function of keeping the filter members upright in their slots, and also not allowing the incoming fluid 175 to enter in between the filter elements. Although the cassette and its components are shown upright in a vertical orientation in FIG. 1, it will be understood by those skilled in the art that the cassette can also be positioned horizontally, without limitation.

Process fluid 175 is pumped into chamber 160 through inlet port 170. Because the pressure in chamber 160 is generally higher than that in channels 147 or 157, that is the filtrate channels, the process fluid is forced towards filtrate channels, and accordingly towards the vertically disposed filter members 140, 145 and 150, 155. As the fluid is forced into the filter media, particulate contaminants larger than a predetermined size will not be able to enter the media, but either continue traveling along surfaces of the filter or fall off the surface of the filter. The solids that travel along the surface of the filter may coagulate, coalesce or form conglomerates on surfaces 148 or 158 of the corresponding filters 140 or 155, respectively; similarly, for surfaces 142 and 152 corresponding to filter elements 145 and 150, respectively. However, the tangential cross flow across the filter surface is intended to clean the surface and keep particulates from building up a "cake." Initially, the fluid portion of the process fluid will pass through the pores of the filter with little or no resistance, thus making up the cleaned filtrate 185. Normally, the clogging process is slowed down by the continual washing of the filter surface that takes place during the filtration process. However, after a period of time, the retentate fluid may become saturated with particulate matter, which increasingly come into contact with the filter surfaces and precipitate out clogging up the the filter pores. As a result, the passage of the fluid through the filter member is greatly diminished, or may cease altogether.

However, by directing an ultrasonic beam 115 from the horn 110 of an ultrasound transducer 100, the accumulated debris on the filter surfaces can be broken up as shown in FIG. 2. The ultrasound transducer may be configured to emit two ultrasonic beams from two-sided transducers having two horns, as shown in the same FIG. 2. This controlled beam blasts the filter media and specifically against sides 148 and 158 of filter media members 140 and 155, respectively, such that the solids and particulate clinging to sides 148 and 158 are knocked off and moved outwardly from the filter media. In one embodiment, the ultrasonic beam may operate at a frecuiency from about 39 to about 41 kilohertz, and at a power level from about 25 to about 1000 watts. These sonicated solids then are washed to ports 190 to be recirculated through the filtration system, or removed when too large to pass through the filter media.

In another embodiment, the ultrasound transducers 100 are operationally configured to sweep the filter media at different angles and at different or variable frequencies to dislodge particles of different sizes and shapes. Furthermore, means are provided to rotate and move the transducers vertically up and down a column (shown in phantom, 117) so as to aim the beam at different portions of the filter media 140 and 155 in different directions to dislodge the accumulated particles more effectively. It will be noted that different banks of transducers 123 and 125 can be installed in the end chambers 163 and 165, as shown FIG. 2 to break loose material that may accumulate on surfaces 142 and 152 of filter media 145 and 150, respectively. It is particularly advantageous to arrange these transducers in close proximity of the surface of the filters, in order to save energy and reduce transducer size.

The portion of the process fluid that passes through the filter media elements 140, 145 and 150, 155 enters filtrate chambers 147 and 157, respectively, as shown in FIG. 2. The cleaned filtrate 185 then flows in channels 47, 47 towards filtrate outlet ports 180 and 183, as shown.

Figure 3:
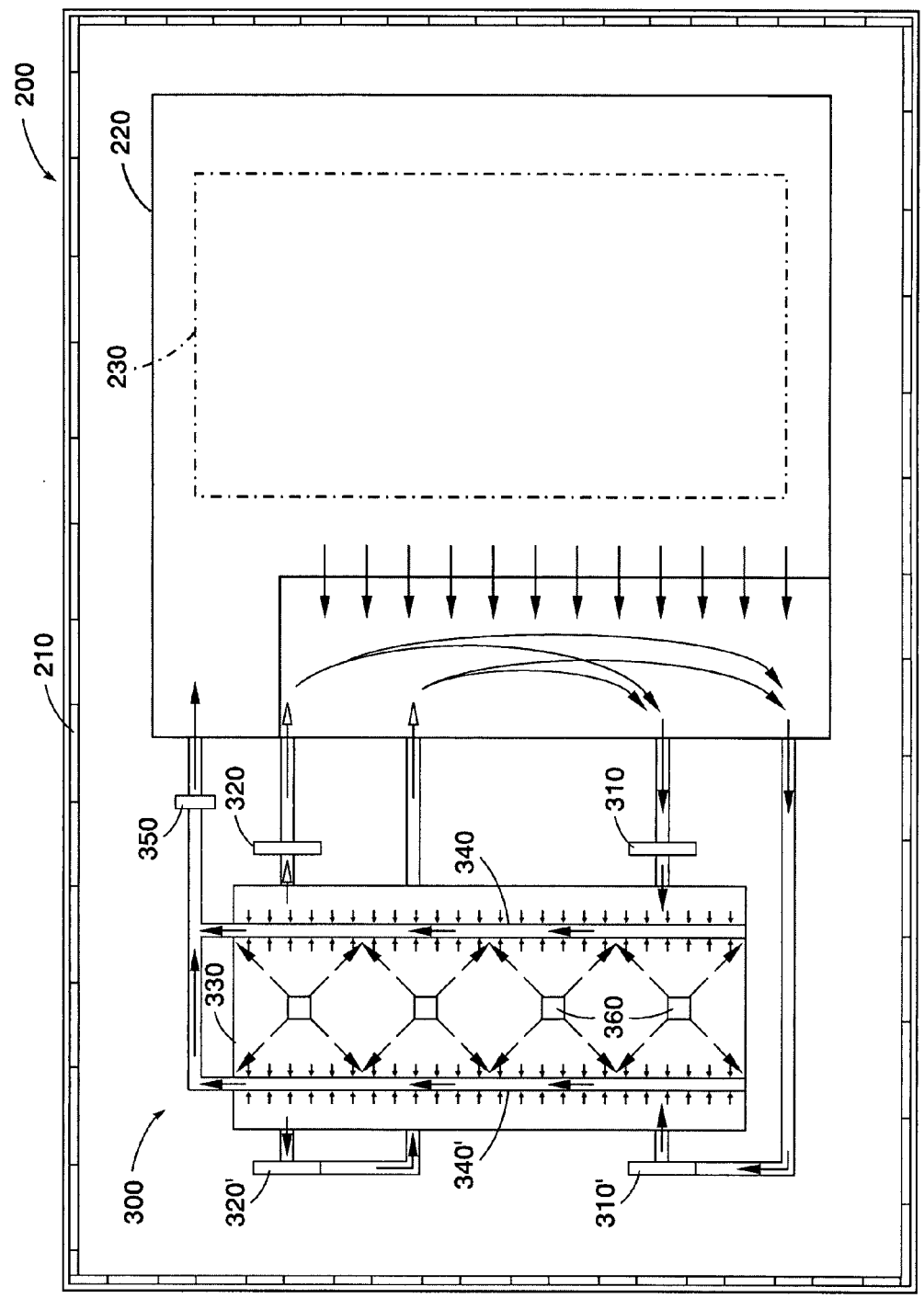
FIG. 3 is a plan view of a hardened or hazard-proof room showing an integrated dual cross flow filtration system further integrated with a manufacturing process wherein the acoustic energy of the ultrasound transducers of the system is also attuned to enhance the manufacturing process.

Another embodiment involves the incorporation of the integrated dual cross infiltration and ultrasonic transducer assembly, or cassette, of the invention into a sector of a manufacturing line where hazardous processes may be performed. In FIG. 3, numeral 200 refers to a manufacturing sector where photoreceptors (generally used for photocopiers) are manufactured. The photoreceptors comprise certain coating materials which are applied in the form of coating dispersions. The coating materials normally require sonication because of the nature of coating dispersions to coagulate, and therefore, hinder successful coating of photoreceptor parts.

Still another embodiment offers efficient filtration of hydroxyl gallium phthalocyanine dispersions in copolymer or PCZ polycarbonate resin dissolved in organic solvents such as toluene or tetrahydrofuran. It is known that organic solvents can be toxic, highly flammable, and therefore hazardous. Therefore, sector 200 is made fire-proof and other sectors of the manufacturing line are protected from the hazardous sector by a fire wall, only schematically shown as a double fire-wall 210. The coating of the photoreceptors (not shown) is generally performed in an area generally designated as 220 where a coating tank 230 resides, as shown in FIG. 3. In current manufacturing lines, the coating solution may be piped to another sector for filtration because of the explosion hazard, which results in several gallons of coating solution and hours of cleanup time are wasted. As such, sector 200 may also be configured to be explosion-proof.

Another embodiment provides an integrated dual cross flow filtration and ultrasonic transducer assembly in the form of a compact cassette right in the same room where the coating of the photoreceptors is performed. The compact cassette 300, which is not drawn to scale, can be rolled into the room, or positioned in the fire-proof room in any convenient manner, and connected to the coating tank in any number of ways. Though not limiting to any particular arrangement, the compact cassette filtration system of the instant invention has recirculation inlet ports 310, 310' and outlet ports 320, 320' which are configured to conduct the coating solution of the coating tank 230, as shown in FIG. 3. The coating solution, that is, the process solution, enters the cassette chambers 330 and is forced to flow across a plurality of sets of filters (two sets of pairs of filters 340 and 340' shown for illustrative purposes in FIG. 3) thereby being filtered as the filtrate advances towards the filtrate outlet port 350. The filtered and cleaned filtrate may then be reprocessed for continual coating purposes. On the other hand, the process solution which could not pass through the filters is recirculated by advancing through the recirculation outlet ports 320 and 320'.

Filter elements 340 and 340' themselves are kept clean by being subjected to ultrasonic cleaning with the aid of ultrasound transducers, representatively referred to by numeral 360, and as also described earlier with reference to FIG. 2. The ultrasonic beams emanating from the transducers are swept over different portions of the filters at different frequency and power levels depending upon the amount of "caking" buildup that occurs on the surfaces of the filters. An aspect of the embodiment provides an indirect method of sensing the buildup through direct measurement of the flow rate of the filtrate.

There may further be provided a method for monitoring the flow rate of the filtrate through the filtration system. This is accomplished by providing a means, such as a flow-meter M, for sensing a predetermined flow velocity of the fluid through the filtration element. Upon sensing the predetermined flow velocity, the ultrasonic beam of the transducer towards the filter facing the transducer is directed with a force sufficient to dislodge and force upstream material which may collect on the side facing the transducer.

In another embodiment of the invention, a method for monitoring the quality of the flow rate of the filtrate is provided through a means P, such as pressure gauge, for sensing a predetermined pressure of the fluid through the filtration element. Upon sensing the predetermined pressure, the ultrasonic beam of the transducer towards the filter facing the transducer is similarly directed with a force sufficient to dislodge and force upstream material which may collect on the side facing the transducer. Again, the closer the transducer is arranged in proximity of the filter elements the lower energy ultrasonic beam is needed to be effective.

In still another embodiment, the frequency and power of the ultrasound transducers can be tuned not only to break up the aggregates, conglomerates and "caking" buildup on the filter elements, but also can be optimized to enhance the coating process through the sonication of the process fluid of the further integrated fluidized system by transmission of acoustic waves into the coating tank.

Multiple sets of filters in the compact cassette may be utilized making it possible to change filters without stopping the filtration or the coating processes, thus enabling essentially a continuous process.

Though these numerous details of the disclosed device and method are set forth here, to provide an understanding of the present invention, it will be obvious, however, to those skilled in the art that these specific details need not be employed to practice the present invention. At the same time, it will be evident that the same methods may be employed in other similar devices and process steps that are too many to cite, such as, for example, the integrated dual cross filtration and ultrasonic transducer cassette of the present invention can be employed in vertical as well as horizontal orientations. The cassette can be independently hardened and made hazard-proof for use in hazardous environments. Also, the integrated filtration and ultrasonic transducer assembly of the instant invention can be adapted for use with a "dead-end" filtration system as well, as an effective filtration apparatus.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A filtration system comprising:
   two or more filter units, each of the filter units including two filter elements with and a filtrate channel formed between each of the filter elements;
   a frame assembly that includes slots to accommodate ingress and egress of the filter units and a chamber, disposed in between each of the filter units;
   one or more transducers integrated into each of the chambers and configured to direct an ultrasonic beam upon the filter elements of the filter units;
   one or more line inlet ports configured to input and circulate process fluid through the chamber and over the filter elements and through the chamber; and
   one or more line outlet ports configured to remove filtrated fluid from the filtration system,
   wherein the filter units are capable of being changed via said ingress and egress through said slots.

2. A filtration system in accordance with claim 1, wherein the filtration system comprises a cross flow filtration system.

3. A filtration system in accordance with claim 1, wherein the filtrate channels are sealably separated from the chambers.

4. A filtration system in accordance with claim 1, wherein four transducers are integrated into each of the chambers.

5. A filtration system in accordance with claim 1, wherein the ultrasonic beam is directed at a frequency from about 39 to about 41 kilohertz, and at a power level from about 25 to about 1000 watts.

6. A filtration system in accordance with claim 1, further comprising:
   means for sensing a predetermined flow velocity of the fluid through the filter elements;
   means for sensing a predetermined pressure of the fluid through the filter elements; and
   upon sensing the predetermined flow velocity or the predetermined pressure of the fluid, means for directing the ultrasonic beam of the transducers towards the filter elements facing the transducers with a force sufficient to dislodge and force upstream material which may collect on the sides facing the transducers.

7. A filtration system in accordance with claim 1, further comprising
   means for moving ultrasonic beam of the transducers while directing the ultrasonic beam against the sides of the filter elements facing the transducers with a force sufficient to dislodge and force upstream material which may collect on the sides facing the transducers, such that a major portion of the filter elements are impacted by the ultrasonic beam.

8. A system in accordance with claim 1, further comprising a fire-proof and/or explosion-proof encasement.

9. A filtration method comprising:
providing a plurality of filter units sets, each of the filter units including two filter elements and a filtrate channel formed between each of the filter elements;
providing a frame assembly that includes slots to accommodate ingress and egress of the filter elements and enable the changing of filter elements and a chamber, disposed in between each of the filter units;
integrating one or more transducers into the chambers, in between each of the filter units, and configured to direct an ultrasonic beam at the filter elements of the filter sets;
introducing a process fluid to the filter elements through the plurality of chambers via an inlet port;
filtering the process fluid through the filter elements to obtain a clean filtrate;
directing the ultrasonic beam of the transducer against the filter elements with a force sufficient to dislodge material attached thereon and into the process fluid for recirculation;
removing the process fluid for recirculation away from the filter element via the chambers through an outlet port; and
collecting clean filtrate from the filtrate channels via a filtrate outlet port.

10. A method in accordance with claim 9, wherein the filtration system comprises a cross flow filtration system.

11. A method in accordance with claim 9, wherein four transducers are integrated into each of the chambers.

12. A filtration system comprising:
a plurality of filter units, each of the filter units including two filter elements and a filtrate channel formed between each of the filter elements;
a frame assembly that includes slots to accommodate ingress and egress of the filter elements and a chamber, disposed in between each of the filter units, that is in fluid communication with the filtrate channels;
one or more transducers integrated into each of the chambers, in between each of the filter units, and configured to direct an ultrasonic beam at upon the filter elements of the filter sets;
one or more line inlet ports configured to recirculate process fluid over the filter elements through each of the chambers;
one or more line outlet ports configured to recirculate process fluid away from the filter elements through each of the chambers;
a plurality of outlet ports for removing filtrated fluid away from the filter elements through the filtrate channels; and
a hazard proof encasement formed around the filtration system,
wherein the filters elements are capable of being changed via said ingress and egress through said slots.

13. A system in accordance with claim 12, wherein the filtration system comprises a cross flow filtration system.

14. A system in accordance with claim 12, wherein the ultrasonic beam is directed at a frequency between about 39 to 41 kilohertz, and at a power level between about 25 to 1000 watts.

15. A system in accordance with claim 12, further comprising:
means for sensing a predetermined flow velocity or a predetermined pressure of the process fluid through the filter elements,
wherein upon sensing the predetermined flow velocity or the predetermined pressure, the ultrasonic beam of the transducer is directed towards the filter elements, facing the transducer with a force sufficient to dislodge and force upstream material which may collect on the side facing the transducer.

16. A system in accordance with claim 12, wherein the hazard-proof encasement comprises a fire-proof encasement.

* * * * *